United States Patent [19]
Wayne et al.

[11] Patent Number: 4,629,022
[45] Date of Patent: Dec. 16, 1986

[54] HOODSCOOP AND METHOD FOR ATTACHING THE SAME

[75] Inventors: Mark Wayne, Southfield, Mich.; Terry Rutherford, Chattanooga, Tenn.

[73] Assignee: Choo Choo Customs, Inc., Chattanooga, Tenn.

[21] Appl. No.: 611,620

[22] Filed: May 18, 1984

[51] Int. Cl.⁴ ............................................. B62D 25/10
[52] U.S. Cl. ................................... 180/69.22; 428/31
[58] Field of Search ................ 180/69.2, 69.22, 69.24, 180/69.23, 68.3; 296/39 A; 293/128; 98/2.14, 2.16, 2.18, DIG 10; 181/204; 428/31, 99

[56] References Cited

U.S. PATENT DOCUMENTS

| | | | |
|---|---|---|---|
| D. 237,960 | 12/1975 | Whitehead | D12/16 |
| 1,130,262 | 3/1915 | Duryer | 180/69.23 |
| 2,808,893 | 10/1957 | Dorman et al. | 180/54 |
| 2,856,228 | 10/1958 | Adell | 296/44 |
| 2,857,973 | 10/1958 | Garrity | 180/69 |
| 3,869,332 | 3/1975 | Loew | 428/31 |
| 4,153,291 | 5/1979 | Conti et al. | 296/193 |
| 4,235,466 | 11/1980 | Mandrik | 293/128 |

Primary Examiner—Harry B. Tanner
Attorney, Agent, or Firm—Gifford, Groh, VanOphem, Sheridan, Sprinkle & Dolgorukov

[57] ABSTRACT

A hoodscoop assembly includes a plastic hoodscoop disposable on a vehicle hood, a noise-reducing tape disposable between the hoodscoop and the vehicle hood, and means for fastening the hoodscoop to the hood. Preferably the attachment of the hoodscoop to the hood occurs by bringing a recess on the periphery of the hoodscoop and the upper surface of the hood each into abutment with the tape, but leaving a small gap between the hood surface and the lower edge of the hoodscoop periphery. A method for assembling such a hoodscoop structure and a kit for the same are included.

14 Claims, 5 Drawing Figures

U.S. Patent  Dec. 16, 1986  Sheet 1 of 2  4,629,022
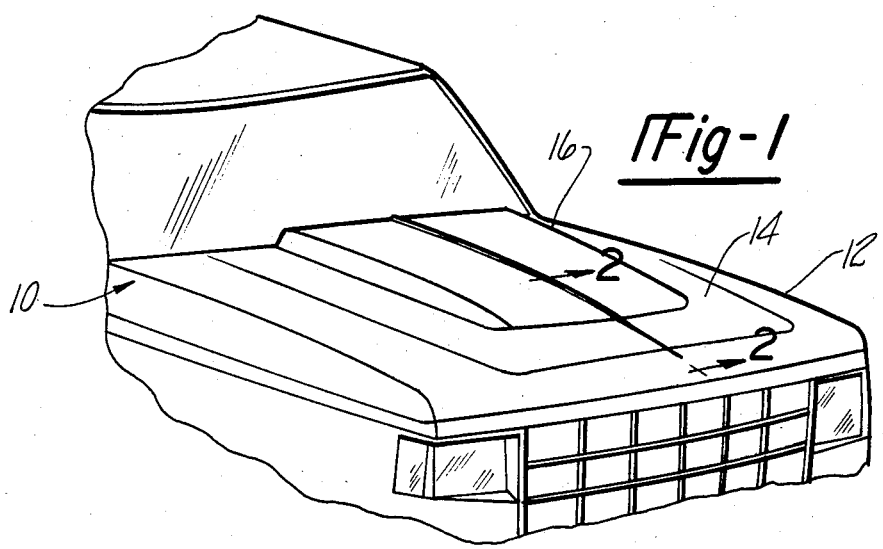
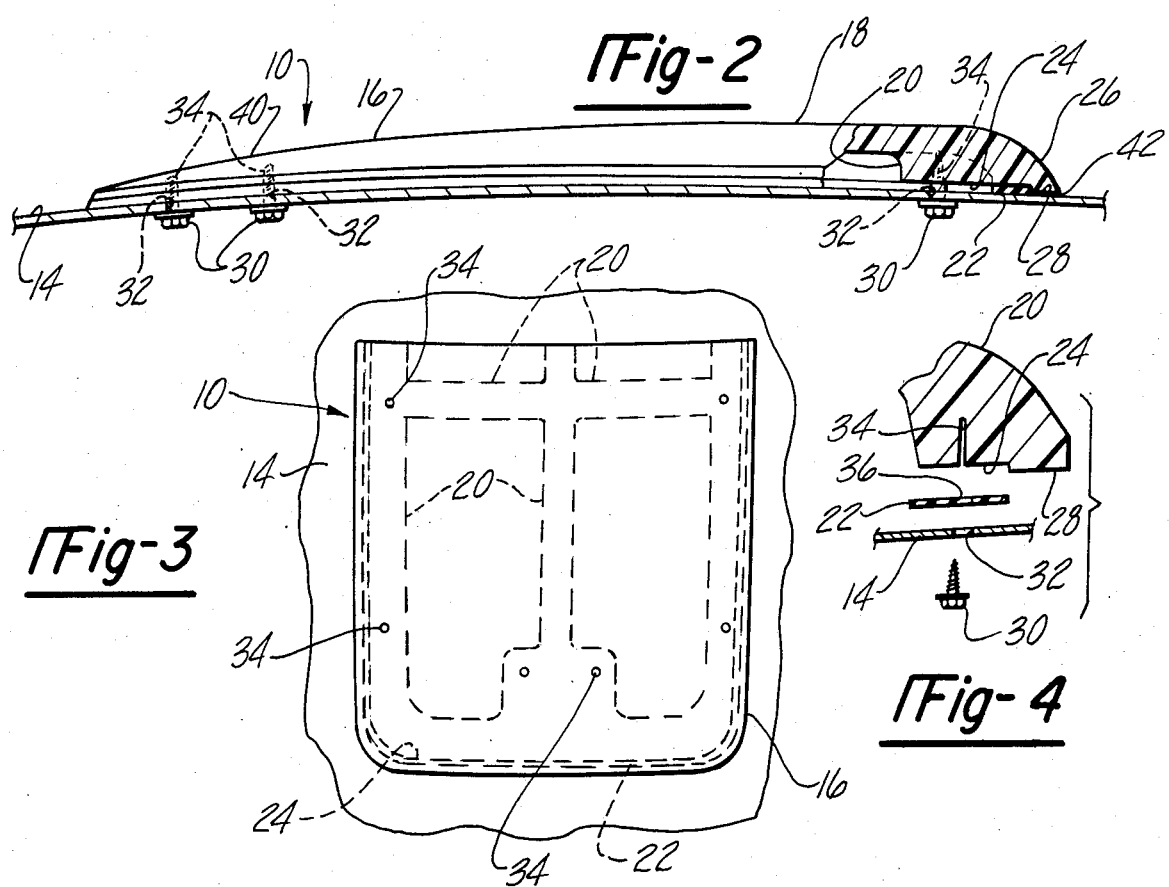

HOODSCOOP AND METHOD FOR ATTACHING THE SAME

BACKGROUND OF THE INVENTION

I. Field of the Invention

The present invention relates generally to automobile hoods and, more particularly, to an automobile hoodscoop and a method for attaching the same to a vehicle.

II. Description of the Prior Art

Both functional and decorative hoodscoops have long been known. Functional hoodscoops serve to assist the feeding of intake air to an automobile engine. They are particularly useful when the automobile's engine is equipped with a supercharger. Decorative hoodscoops are nonfunctional imitations of functional hoodscoops, and give vehicles a more attractive appearance. Conventionally, hoodscoops of either type are constructed of sheet metal and/or plastic, and are directly attached to the vehicle hood, for example, by means such as bolts.

While known hoodscoops have functioned adequately for their intended purposes, their use has entailed several drawbacks. The direct mounting of a hoodscoop to a hood can often result in the deformation of either the hood or the hoodscoop, when they are fastened together with sufficient force to prevent their separation during use of the vehicle. Such separation can occur, for example, from road vibration, or from the air stream passing over the vehicle body. The use of conventional hoodscoops, and in particular decorative hoodscoops, can also result in an increase in the noise level associated with the vehicle. This increase arises from vibration of the hoodscoop against the hood, when part or all of the hoodscoop (through loosening from age or insufficient tighting) does not fully abut the vehicle hood. This increase in noise level also arises from the passage of air over any unsealed gap between the hoodscoop and hood. Another disadvantage of prior hoodscoops is the degree of care necessary to properly attach and align the hoodscoop with the vehicle hood.

SUMMARY OF THE PRESENT INVENTION

The present invention overcomes the above mentioned disadvantages of previously known hoodscoops by providing a positively aligned hoodscoop having reduced noise characteristics.

In brief, the hoodscoop assembly according to the present invention comprises a hood and a hoodscoop disposed on the hood. A noise reducing tape is aligned with the hood and scoop. The hood and scoop are each in abutment with the tape, and means for fastening the scoop to the hood are disposed adjacent the tape. Preferably, the scoop has a recess disposed about at least part of its periphery, the tape abutting the recess. The tape is preferably noise reductive, such as by being a rubberized tape, and bears adhesive on both sides.

The present invention also provides a method for constructing such a hoodscoop assembly. An attachment-directing template is placed on the hood, and the tape is applied to the hood in accordance with the template. The hoodscoop is then placed on the hood by aligning it with the tape, and is fastened to the hood with the fastening members disposed adjacent to the tape. The invention also includes a kit comprising the hoodscoop, the tape, the fastening members and the template.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view of the preferred embodiment of the present invention;

FIG. 2 is a cross-sectional view taken along line 2—2 of FIG. 1;

FIG. 3 is a top view of the preferred embodiment of the present invention;

FIG. 4 is a partial cross-sectional view of another preferred embodiment of the present invention.

DETAILED DESCRIPTION OF THE PREFERRED EMBODIMENTS OF THE PRESENT INVENTION

Figure 5:
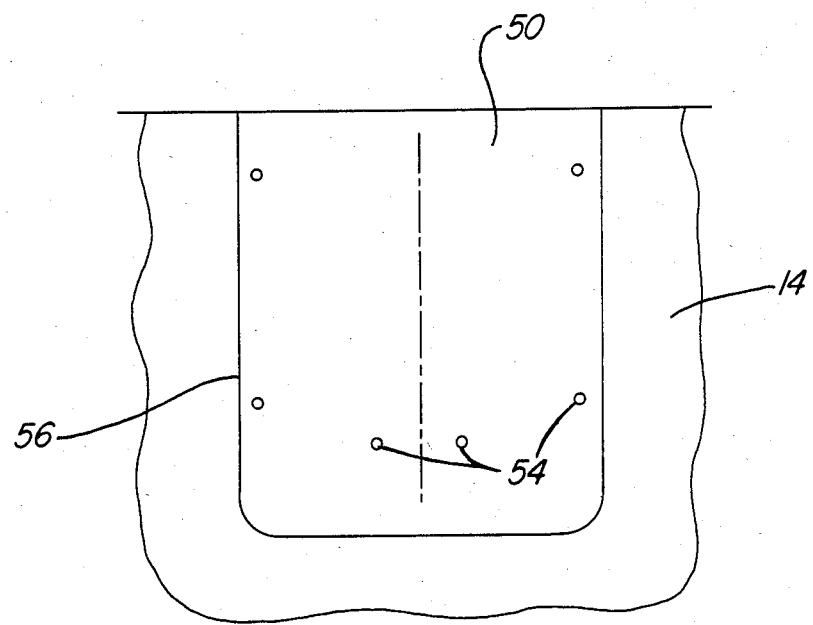
FIG. 5 is a top plan view of the template used according to the preferred method.

With reference now to FIGS. 1 through 3, a hoodscoop assembly 10 according to the present invention is thereshown and first comprises a hoodscoop 16 disposed on the hood 14 of a vehicle 12. Although hereinafter described as a decorative hoodscoop, the hoodscoop can have one or more portions or apertures for the passage of air therethrough, and thereby be a functional hoodscoop.

The hoodscoop 16 conventionally comprises a planar portion 18 and one or more supportive portions 20. The supportive portions 20 serve to maintain the planar portion 18 in a spaced relationship relative to the vehicle hood 14. In the preferred embodiment, the hoodscoop 16 is constructed from a molded plastic material, and the support portions 20 additionally serve to maintain the shape of the hoodscoop 16, whether or not attached to a vehicle. Preferably, the hoodscoop 16 is polyethylene or a RIM plastic.

The hoodscoop assembly 10 also comprises a noise reducing tape 22 disposed between the hoodscoop 16 and the vehicle hood 14. The tape 22 is of a known type, having adhesive on both sides and being of a resilient material, such as rubber. Preferably, the tape 22 is abuttable against a recess 24 formed on at least a portion of the outer periphery 26 of the hoodscoop 16. Preferably, the tape 22 is slightly thicker than the depth of the recess 24, so that a lower edge 28 of the periphery 26 of the hoodscoop is spaced slightly from the hood 14 when the hoodscoop 16 is attached to the hood 14.

The hoodscoop 16 is attached to the vehicle hood 14 by fastening members such as screws 30. The screws 30 are disposed adjacent the tape 22. Although the screws 30 can pass through a corresponding hole 36 in the tape 22 (FIG. 4), preferably the screws 30 are disposed adjacent the tape 22. In either event, the screws 30 should be close enough to the tape 22 to bring each of the scoop 16 and the hood 14 into sealing engagement with the tape 22 when the screws 30 are tightened. In order to bring about this occurrence, the screws 30 pass through holes 32 in the hood 14, adjacent the tape 22, and threadably engage corresponding holes 34 in the supportive portions 20. The supportive portions 20 are sufficiently thick so as to avoid any breaching of an upper surface 40 of the scoop 16 by the screws 30 when they are tightened. Preferably, a slight gap 42 is left between the lower edge 28 of the hoodscoop periphery 26 and the upper surface of the hood 14 so that, upon flexure of the hood 14 and the scoop 16 due to wind, vibration, or the like, the outer periphery 26 of the hoodscoop 16 does not contact the upper surface 40 of the hood 14.

The method of constructing the hoodscoop assembly 10, by attaching the scoop 16 to the vehicle hood 14, is straightforward. First referring to FIG. 5 a template 50 is laid on the vehicle hood 14 and aligned appropriately. The template 50 is of a type which directs the attachment of the hoodscoop 16 to the hood 14, by directing at 54 the positioning of the holes 32 to be drilled in the hood 14 and by directing the placement of the tape 22 onto the hood 14 around the peripheral edge 56 of template 50. Next, the holes 32 are drilled through the hood 14 in accordance with the template. The tape 22 is then applied to the hood 14 in accordance with the template 50 as well. If the hoodscoop assembly 10 is of the type wherein the screws 30 pass through the tape 22, the tape can be breached at this point by drilling or otherwise; alternatively, the tape can be breached by simply screwing the screws 30 through the tape 22 when the screws are inserted. The adhesive on the tape 22 will allow it to maintain its position during the remainder of the assembly procedure.

Once the tape 22 is in position, the hoodscoop 16 is laid atop the hood 14 in a position as directed by the position of the tape 22 and the holes 32. Preferably, this occurs by abutment of the recess 24 on the hoodscoop 16 with the tape 22. Once the hoodscoop 16 has been aligned with the tape 22 and the holes 32, the hoodscoop 16 is fastened to the hood 14 by insertion of the screws 30. The screws 30 are attached through the holes 32 in the hood 14, adjacent the tape 22, and into the holes 34 in the supportive portions 20 of the hoodscoop 16. The screws are tightened until each of the hoodscoop 16 and the hood 14 are brought into a sealing abutment with the tape 22. Preferably, the degree of tightening or the thickness of the tape 22 are selected so as to leave the gap 42 between the lower edge 28 of the hoodscoop periphery 26 and the upper surface of the hood 14. This has the advantage of obviating vibration of the hoodscoop periphery 26 against the hood 14 during operation of the vehicle.

The template 50 can be removed, if desired, any time after the positions of the tape 22 and holes 32 relative to the hood 14 have been determined. Preferably, the template 50 is removed just prior to any point where it would begin to interfere with the adhesion of the tape 22 to the hood 14.

A kit for attaching the hoodscoop 16 to the vehicle hood 14 includes the template 50, the hoodscoop 16, the tape 22 and fastening means 30.

The hoodscoop assembly 10 and the method according to the present invention are particular advantageous in that the tape 22 serves both as a means for aligning the placement of the hoodscoop 16 on the vehicle hood 14, and also serves to deaden noise arising from the use of the hoodscoop assembly 10 once constructed. Having described our invention, however, many modifications thereto will become apparent to one skilled in the art to which it pertains without deviation from the spirit of the invention as defined by the scope of the appended claims.

We claim:

1. A method for the attachment of a hoodscoop to a vehicle hood comprising:

(a) placing an attachment-directing template on a vehicle hood;
(b) applying a noise-reducing tape to the upper surface of said hood according to said template wherein said tape has an adhesive on both sides thereof to provide sealing engagement between said tape and the vehicle hood, and said tape having a predetermined thickness;
(c) placing said hoodscoop, having an inwardly disposed peripheral recess of a preset depth, on said hood by aligning said peripheral recess with said applied tape thereby providing sealing engagement between said tape and said hoodscoop; and
(b) fastening said hoodscoop to said hood so as to bring each of said recess of said hoodscoop and said hood into abutting engagement with said tape wherein the thickness of said tape is greater than the depth of said recess so that said tape spaces said hoodscoop upwardly from the hood.

2. The method according to claim 1, wherein said method comprises an additional step prior to step (c) of drilling holes into said hood in accordance with said template and adjacent the position indicated for said tape by said template.

3. The method according to claim 2, wherein step (d) comprises passing fastening members through said holes in said hood adjacent said tape and engaging said members with said hoodscoop.

4. The method according to claim 3, wherein said passing step comprises such a step employing screws as said fastening members.

5. The method according to claim 4, wherein the step of engaging said members with said hoodscoop comprises the tightening of said screws until each of said hoodscoop and said tape, and said tape and said hood, but not said hoodscoop and said hood, are brought into abutment at the location wherein said tape is disposed.

6. The method according to claim 1, wherein said bringing of said recess into abutment comprises the bringing about of such abutment without bringing the outer periphery of said hoodscoop into abutment with said hood.

7. The method according to claim 3, wherein said fastening members are passed through said tape.

8. The method according to claim 1, wherein said method comprises the removal of said template prior to any interference with the application of said tape to said hood.

9. A hoodscoop assembly comprising:

a hood;
a hoodscoop disposed on said hood wherein said hoodscoop includes an inwardly disposed recess extending at least a portion about the periphery of said hoodscoop and having a preset depth;
means for reducing noise caused by vibration between said hoodscoop and said hood comprising
a noise-reductive tape, having a thickness and adhesive on both sides thereof, aligned with and disposed between said hood and said recess of said hoodscoop, each of said hood and said hoodscoop being sealingly engaged with said tape; and
means for fastening said hoodscoop to said hood disposed adjacent said tape wherein the thickness of said tape is greater than the depth of said recess so that said tape spaces said hoodscoop upwardly from said hood.

10. The invention according to claim 9, wherein said hood comprises a plurality of portions defining holes therein, said fastening means being disposed in said hole.

11. The invention according to claim 10, wherein said fastening means comprises screws passing through said hood and threadably engaging said hoodscoop.

12. The invention according to claim 10, wherein said tape and said holes are aligned with each other, and said fastening means pass through said tape.

13. The invention according to claim 9, wherein said hoodscoop comprises central supportive portions which abut said hood.

14. The invention according to claim 9, wherein said hoodscoop is constructed from a plastic material.

* * * * *

UNITED STATES PATENT AND TRADEMARK OFFICE
CERTIFICATE OF CORRECTION

PATENT NO. : 4,629,022

DATED : December 16, 1986

INVENTOR(S) : Mark Wayne, et al

It is certified that error appears in the above-identified patent and that said Letters Patent is hereby corrected as shown below:

On the title page assignee should read

--(73) Assignee: Rogford Development Company, Inc.,
Part Interest --.

Signed and Sealed this

Twentieth Day of December, 1988

Attest:

DONALD J. QUIGG

Attesting Officer          Commissioner of Patents and Trademarks